US012579424B2

(12) United States Patent
Ding et al.

(10) Patent No.: US 12,579,424 B2
(45) Date of Patent: Mar. 17, 2026

(54) METHOD AND APPARATUS FOR ADVERSARIAL TRAINING OF MACHINE LEARNING MODEL, AND MEDIUM

(71) Applicant: BEIJING BAIDU NETCOM SCIENCE AND TECHNOLOGY CO., LTD., Beijing (CN)

(72) Inventors: Siyu Ding, Beijing (CN); Shuohuan Wang, Beijing (CN); Yu Sun, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 1112 days.

(21) Appl. No.: 17/369,699

(22) Filed: Jul. 7, 2021

(65) Prior Publication Data

US 2021/0334659 A1 Oct. 28, 2021

(30) Foreign Application Priority Data

Dec. 16, 2020 (CN) .......................... 202011488742.5

(51) Int. Cl.
*G06N 3/08* (2023.01)
*G06N 3/04* (2023.01)

(52) U.S. Cl.
CPC ................. *G06N 3/08* (2013.01); *G06N 3/04* (2013.01)

(58) Field of Classification Search
CPC ........ G06N 3/04; G06N 3/045; G06N 3/0475; G06N 3/0499; G06F 40/58; G06F 40/30; G06F 40/40

(Continued)

(56) References Cited

U.S. PATENT DOCUMENTS

2019/0156183 A1  5/2019 Durham
2020/0081982 A1  3/2020 Tu et al.
2020/0327446 A1* 10/2020 Jia ............................ G06N 3/08

FOREIGN PATENT DOCUMENTS

CN 109190661 A  1/2019
CN 109697048 A  4/2019

(Continued)

OTHER PUBLICATIONS

Huang, G., Sun, Y., Liu, Z., Sedra, D., Weinberger, K. Q., "Deep Networks with Stochastic Depth," Computer Vision—ECCV 2016, vol. 9908, pp. 646-661, Sep. 2016 (published: 2016) (Year: 2016).*

(Continued)

*Primary Examiner* — Tsu-Chang Lee
(74) *Attorney, Agent, or Firm* — Lippes Mathias LLP

(57) ABSTRACT

The present application discloses a method and an apparatus for adversarial training of a machine learning (ML) model and a medium. The method includes: obtaining input information in a training sample; extracting features of a plurality of input characters in the input information; inputting the features of the plurality of input characters to the ML model, to capture an attention weight on an input character of the plurality of input characters by an attention layer of the ML model; disturbing the attention weight captured by the attention layer, so that the ML model outputs a predicted character according to the attention weight disturbed; and training the ML model according to a difference between the predicted character and a labeled character in the training sample.

15 Claims, 4 Drawing Sheets

(58) Field of Classification Search
USPC ........................................................ 706/21
See application file for complete search history.

(56) References Cited

FOREIGN PATENT DOCUMENTS

| | | | | | |
|---|---|---|---|---|---|
| CN | 109754078 | A | 5/2019 | | |
| CN | 109948658 | A | 6/2019 | | |
| CN | 110334548 | A | 10/2019 | | |
| CN | 111325205 | A | * | 6/2020 | .......... G06K 9/3208 |
| CN | 111401415 | A | 7/2020 | | |
| CN | 111651992 | A | 9/2020 | | |
| JP | 2020506466 | A | 2/2020 | | |
| WO | 2019087033 | A1 | 5/2019 | | |
| WO | 2020123207 | A1 | 6/2020 | | |

OTHER PUBLICATIONS

Lin, Z., Feng, M., Santos, C. N., Yu, M., Xiang, B., Zhou, B., Bengio, Y., "A Structured Self-Attentive Sentence Embedding," ArXiv, abs/1703.03130, Mar. 2017 (published: 2017) (Year: 2017).*
Miyato, T., Dai, A., Goodfellow, I., "Adversarial Training Methods for Semi-Supervised Text Classification," ArXiv, abs/1605.07725v3, May 2017 (published: 2017) (Year: 2017).*
Office Action for Japanese Application No. 2021-144744, dated Oct. 4, 2022, 3 pages.
Joris Baan et al., "Do Transformer Attention Heads Provide Transparency in Abstractive Summarization?", Jul. 8, 2019, 9 pages.
Lee, et al. "Interactive Visualization and Manipulation of Attention-based Neural Machine Translation" NAVER Corp. 6 pgs.
Notice of Allowance for CN application 2020114887425, 7 pgs.
Chen, et al. "Determination of Wheat Protein by Optimized Near Infrared Spectrum LS-SVM Model", Nanchong Vocational and Technical College, 5 pgs.

* cited by examiner

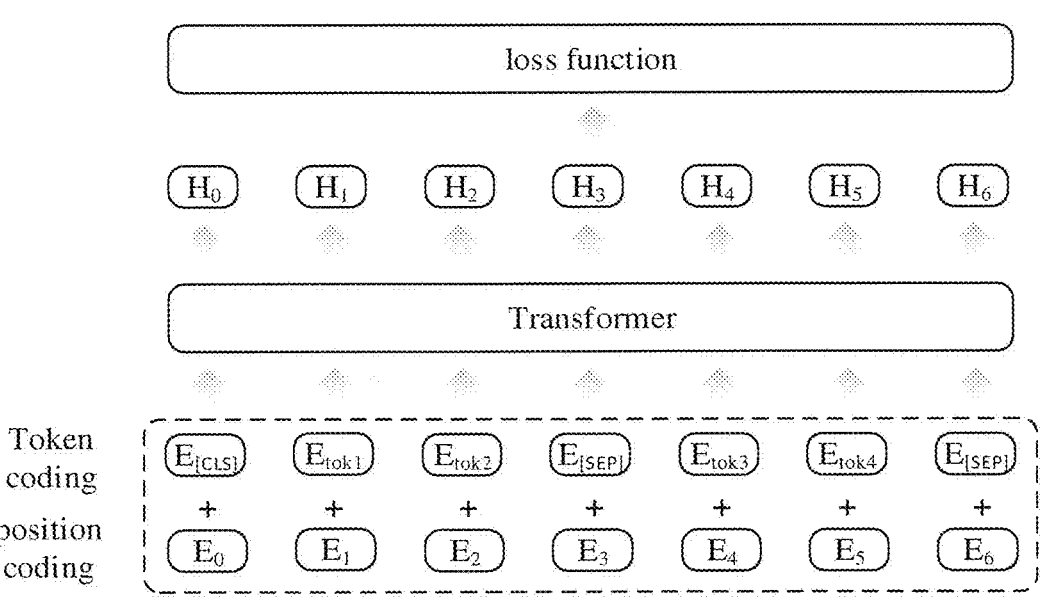

Fig. 1 obtaining input information in a training sample  —— 201 extracting features of a plurality of input characters in the input information  —— 202 the features of the plurality of input characters are inputted into the ML model, to capture an attention weight on an input character of the plurality of input characters by an attention layer of the ML model  —— 203 the attention weight captured by the attention layer is disturbed, so that the ML model outputs a predicted character according to the attention weight disturbed  —— 204 the ML model is trained according to a difference between the predicted character and a labeled character in the training sample  —— 205

Fig. 2

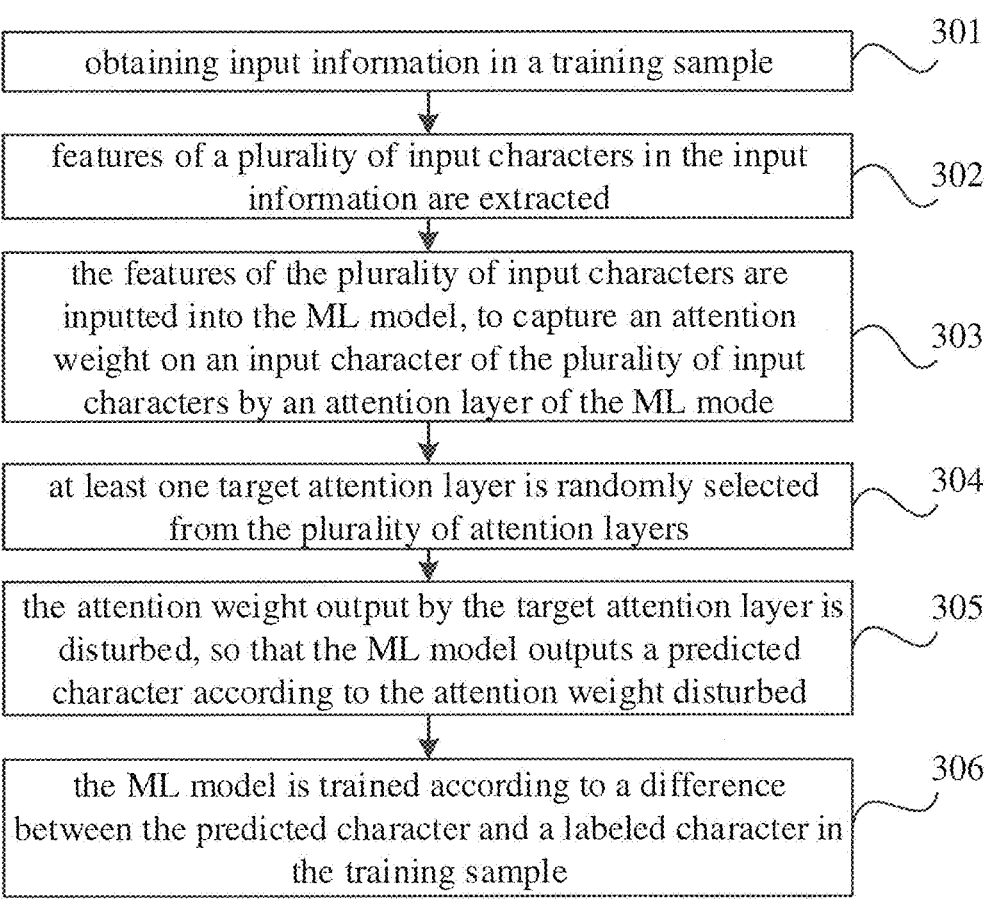

obtaining input information in a training sample ⟩301 features of a plurality of input characters in the input information are extracted ⟩302 the features of the plurality of input characters are inputted into the ML model, to capture an attention weight on an input character of the plurality of input characters by an attention layer of the ML mode ⟩303 at least one target attention layer is randomly selected from the plurality of attention layers ⟩304 the attention weight output by the target attention layer is disturbed, so that the ML model outputs a predicted character according to the attention weight disturbed ⟩305 the ML model is trained according to a difference between the predicted character and a labeled character in the training sample ⟩306

Fig. 3

METHOD AND APPARATUS FOR ADVERSARIAL TRAINING OF MACHINE LEARNING MODEL, AND MEDIUM

CROSS-REFERENCE TO RELATED APPLICATION

The present application is based upon and claims priority to Chinese Patent Application No. 202011488742.5, filed on Dec. 16, 2020, the entirety contents of which are incorporated herein by reference.

TECHNICAL FIELD

The present disclosure relates a field of Artificial Intelligence (AI) technologies such as Natural Language Processing (NLP), Deep Learning (DL), etc., and specifically, provides a method and an apparatus for adversarial training of a machine learning (ML) model, an electronic device and a medium.

BACKGROUND

With rapid development of world economy, increasingly frequent international cultural exchange and high speed development of internet technology and rapid enhancement of global informatization, the traditional method relying on human translation may not meet the requirement of people's daily intercultural communication. Machine translation may automatically translate one language into another language by a computer, which is one of the most powerful means to solve language barrier issues. In the ideal state, machine translation method not only needs to exactly predict unseen instances but also resist adversarial attacks, that is, may recognize an adversarial sample of adding noise. Therefore, in order to enhance the quality of machine translation result, it is of great importance how to achieve adversarial training of a translation model.

SUMMARY

The present disclosure provides a method and an apparatus for adversarial training of a machine learning (ML) model, and a medium.

According to embodiments of the present disclosure, a method for adversarial training of an ML model is provided, and the method includes: obtaining input information in a training sample; extracting features of a plurality of input characters in the input information; inputting the features of the plurality of input characters to the ML model, to capture an attention weight on an input character of the plurality of input characters by an attention layer of the ML model; disturbing the attention weight captured by the attention layer, so that the ML model outputs a predicted character according to the attention weight disturbed; and training the ML model according to a difference between the predicted character and a labeled character in the training sample.

According to embodiments of the present disclosure, an apparatus for adversarial training of an ML model is provided, and the apparatus includes: one or more processors; a memory storing instructions executable by the one or more processors; in which the one or more processors are configured to: obtain input information in a training sample; extract features of a plurality of input characters in the input information; input the features of the plurality of input characters to the ML model, to capture an attention weight on an input character of the plurality of input characters by an attention layer of the ML model; disturb the attention weight captured by the attention layer, so that the ML model outputs a predicted character according to the attention weight disturbed; and train the ML model according to a difference between the predicted character and a labeled character in the training sample.

According to embodiments of the present disclosure, a non-transitory computer-readable storage medium storing computer instructions is provided, in which when the computer instructions are executed by a computer, the computer is caused to execute the method for adversarial training of an ML model in embodiments of the present disclosure. The method includes: obtaining input information in a training sample; extracting features of a plurality of input characters in the input information; inputting the features of the plurality of input characters to the ML model, to capture an attention weight on an input character of the plurality of input characters by an attention layer of the ML model; disturbing the attention weight captured by the attention layer, so that the ML model outputs a predicted character according to the attention weight disturbed; and training the ML model according to a difference between the predicted character and a labeled character in the training sample.

It should be understood that, the content described in the part is not intended to recognize key or important features of embodiments of the present disclosure, nor intended to limit the scope of the present disclosure. Other features of the present disclosure will be easy to understand through the following specification.

BRIEF DESCRIPTION OF THE DRAWINGS

The drawings are intended to better understand the solution, and do not constitute a limitation to the disclosure.

FIG. 1 is a diagram illustrating principle of an ALUM;

FIG. 2 is a flowchart illustrating a method for adversarial training of a Machine Learning (ML) model provided in a first embodiment of the present disclosure;

FIG. 3 is a flowchart illustrating a method for adversarial training of a Machine Learning (ML) model provided in a second embodiment of the present disclosure;

DETAILED DESCRIPTION

Figure 4:
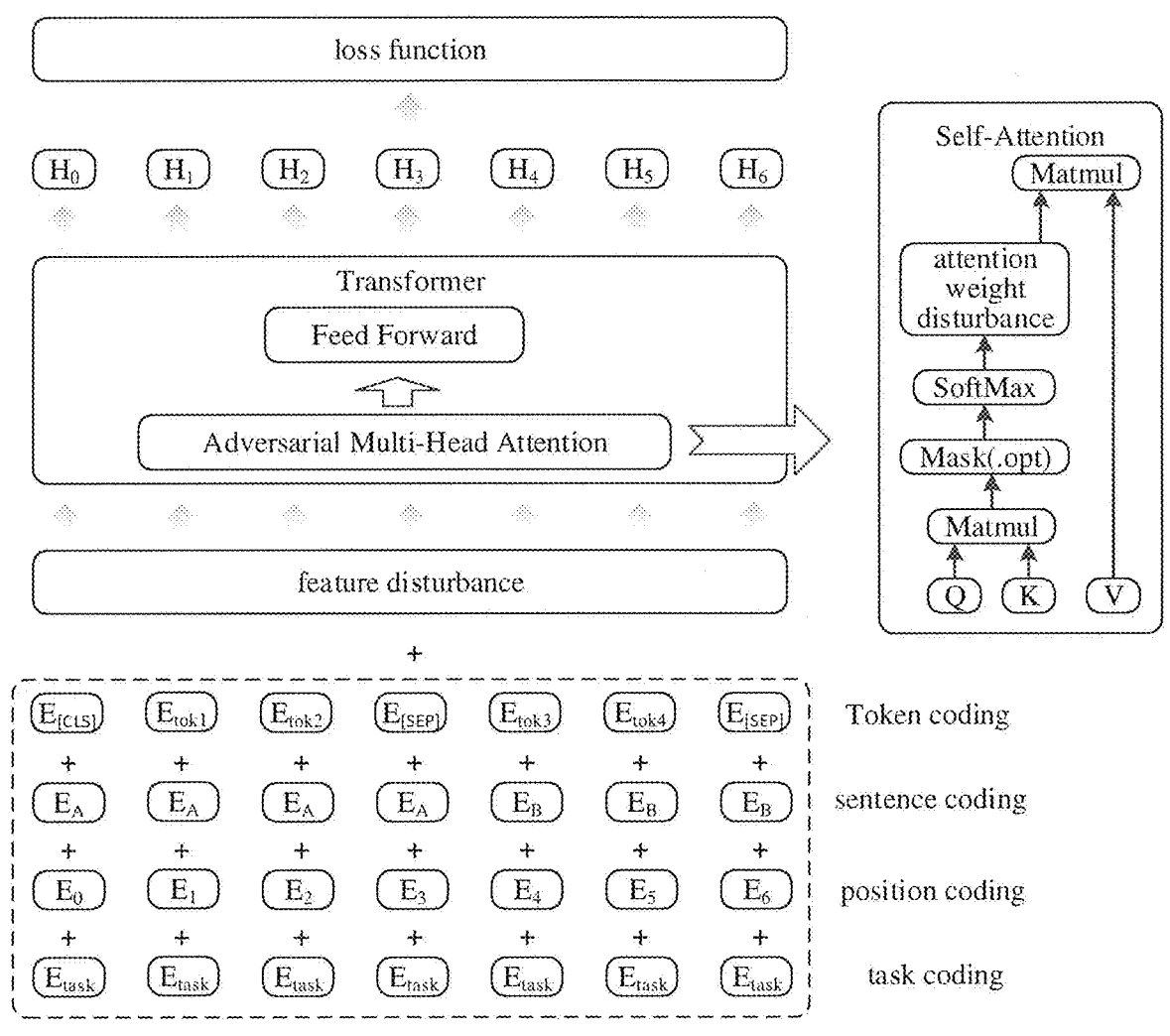
FIG. 4 is a schematic diagram illustrating a structure of a Machine Learning (ML) model in the embodiment of the present disclosure.

The exemplary embodiments of the present disclosure are described as below with reference to the accompanying drawings, which include various details of embodiments of the present disclosure to facilitate understanding, and should be considered as merely exemplary. Therefore, those skilled in the art should realize that various changes and modifications may be made to the embodiments described herein without departing from the scope and spirit of the present disclosure. Similarly, for clarity and conciseness, descriptions of well-known functions and structures are omitted in the following descriptions.

In the ideal state, a machine learning (ML) algorithm not only needs to exactly predict unseen instances but also resist adversarial attacks, that is, the algorithm needs to have an ability of recognizing an adversarial sample of adding noise. At present, a pre-training language model represented by BERT (Bidirectional Encoder Representations from Transformer) proposes a "Pre-training+Fine-tuning" paradigm, which greatly improves the effect of various NLP tasks. However, the above algorithm still may not adapt to an adversarial scenario.

Adversarial training is a training method designed using adversarial samples, so as to enhance generalization and robustness of a model. In a computer vision field, a large number of explorations on adversarial sample attacks and adversarial training have been made, and in natural language processing (NLP), the research on adversarial training has attracted more and more attention from scholars.

At present, the method for adversarial training in the field of NLP mainly includes the following two methods:

First, an adversarial sample is generated based on the original input text, for example, by replacing a part of words in the original input text, that is, an adversarial sample with added noise is generated based on the original text, and the sample is used to perform adversarial training on the model.

Second, an adversarial sample is generated based on a stream type space, for example, disturbance is performed on an embedding space, that is, the disturbance is directly added on a feature vector corresponding to the input text, so as to generate an adversarial sample with added noise, and adversarial training may be performed on a model by using the adversarial sample.

For the second method for adversarial training, the most typical modeling method is Adversarial Training for Large Neural Language Models (ALUM), and the ALUM generate the adversarial sample by performing disturbance on the embedding space of the input text, so as to achieve adversarial training. The principle of an ALUM may be as illustrated in FIG. 1.

Token is the minimum unit input to a model, for example, in Chinese, a token is a character, and a token code is a character vector, and in English, a token is a word, and a token code is a word vector. H0, H1, . . . , H6 are feature vectors output by a model. As illustrated in FIG. 1, the ALUM method is configured to directly perform disturbance on a feature vector corresponding to each character of the input text, to generate the adversarial sample.

The ALUM is an algorithm that first attempts to generate an adversarial sample in a stream type space so that adversarial training is further performed in a NLP field. However, a disturbance strategy on an embedding space in the ALUM is a universal strategy, which may be applied to a model based on Transformer and other types of models, that is, the ALUM model doesn't take full use of Self-Attention in Transformer.

Therefore, the above two adversarial training methods may be adapted to a pre-training language model with Transformer as the basic structure. However, the above two adversarial training methods don't take the advantage of Transformer, that is, the above two adversarial training methods don't generate an adversarial sample from the perspective of Self-Attention, so as to achieve adversarial training of a model. The Self-Attention is a key strategy of Transformer, which decides the dependence degree or attention degree of a character on the surrounding characters, and also a key factor that affects the final effect of a model. Therefore, the present disclosure proposes a disturbance strategy for the attention weight, to achieve adversarial training of an ML model and take the advantage of Self-Attention in Transformer.

A method and an apparatus for adversarial training of an ML model, an electronic device and a medium are described referring to figures in embodiments of the present disclosure.

FIG. 2 is a flowchart illustrating a method for adversarial training of an ML model provided in a first embodiment of the present disclosure.

The embodiment of the present disclosure illustrates that the method for adversarial training of the ML model is performed by an apparatus for adversarial training of the ML model. The apparatus for adversarial training of the ML model may be applied to any electronic device, so that the electronic device may perform adversarial training of an ML model.

In which, the electronic device may be a device with computing capacity, for example, a personal computer (PC), a mobile terminal, a server, etc. The mobile terminal may be, for example, a mobile phone, a tablet computer, a personal digital assistant, a wearable device, a vehicle-mounted device, and other hardware devices with various operating systems, touch screens, and/or display screens.

As illustrated in FIG. 2, the method for adversarial training of an ML model may include the following blocks:

At block 201, input information in a training sample is obtained.

In the embodiment of the present disclosure, a training sample may be selected according to the translation requirement, in which, input information of each training sample may be text information in the same or different languages.

For example, when the ML model is configured to translate text information in a first language into text information in a second language which is different from the first language, for example, the first language may be Chinese and the second language may be English, or the first language may be Chinese and the second language may be French, etc., the language of the input information in each training sample may be a first language.

For another example, when the ML model is configured in a scenario where a first language is inter-translated with a second language, for example, a Chinese-English translation scenario, a training sample may include a training sample belonging to input information of a first language, and/or, a training sample belonging to input information of a second language, that is, the language of input information of each training sample may be a first language, or a second language, or, may contain a first language and a second language at the same time, which is not limited here.

In the embodiment of the present disclosure, a training sample may be selected according to the translation requirement, and input information of a training sample may be obtained.

As an example, a corpus may be constructed according to the translation requirement, in which, a corpus may contain a plurality of bilingual sentence pairs, and each bilingual sentence pair may include two sentences translated into two languages, and a training sample may be generated according to a bilingual sentence pair. For example, one sentence of a bilingual sentence pair may be determined as input information of a training sample, and the training sample is labeled according to the other sentence in the bilingual sentence pair to obtain the labeled training sample.

At block 202, features of a plurality of input characters are extracted in the input information.

In the embodiment of the present disclosure, after the input information of the training sample is obtained, feature extraction may be performed on each character of input information which is denoted as an input character in the present disclosure, such that features of multiple input characters are obtained. For example, when the language the input information is Chinese, the feature of each input character may be a character vector of a Chinese character, and when the language the input information is English, the feature of each input character may be a word vector of an English word.

In a possible implementation in the embodiment of the present disclosure, each input character in the input information may be coded through a coder, to obtain features corresponding to each input character in the input information.

In another possible implementation in the embodiment of the present disclosure, feature extraction may be performed on each input character in the input information based on a feature extraction algorithm of NLP technology, to obtain features corresponding to each input character.

It should be noted that, the above embodiments are exemplary, the present disclosure may further include other known coding methods or a feature extraction method or a character vector computation method for obtaining features of the input character.

At block 203, the features of the plurality of input characters are inputted into the ML model, to capture an attention weight on an input character of the plurality of input characters by an attention layer of the ML model.

In the embodiment of the present disclosure, features of the multiple input characters may be inputted into the ML model, to capture an attention weight on an input character by an attention layer of the ML model.

The attention weight is configured to represent attention degree of each input character in a plurality of the input characters on other characters. For example, when the language of input information is Chinese, for example, the input information is " 我爱打篮球 (Chinese characters, which means that I love to play basketball.)", the dependence degree or attention degree of input characters " 我 (Chinese character, which means I)" on " 爱 (Chinese character, which means love)" should be lower than the dependence degree or attention degree of input characters "篮 (Chinese character, which means basket)" on "球 (Chinese character, which means ball)", for example, the dependence degree or attention degree of "我(I) " on " 爱 (love)" is represented by 0.2, and the dependence degree or attention degree of input characters "篮 (basket)" on "球 (ball)" is represented by 0.8.

In a possible implementation in the embodiment of the present disclosure, an attention layer may determine the dependence degree or attention degree of each input character on other characters in input information based on a preset algorithm or according to a specific rule, so as to output an attention weight. For example, an attention layer may perform computation processing on features of each input character and determine the dependence degree or attention degree of each input character on other characters in input information based on a preset algorithm or according to a specific rule, so as to obtain an attention weight.

Thus, the attention weight configured to represent attention degree of each input character on other characters may be calculated, so that an attention weight may be disturbed subsequently to interfere with training of the ML model, further to achieve adversarial training of the model and enhance generalization and robustness of a model.

At block 204, the attention weight captured by the attention layer is disturbed, so that the ML model outputs a predicted character according to the attention weight disturbed.

In the embodiment of the present disclosure, disturbance is performed on the attention weight captured by the attention layer, so that the ML model outputs a predicted character according to the attention weight after the disturbance.

For example, the attention weight output by an attention layer is disturbed, taking the above example, the dependence degree or attention degree of "我 (I)" on "爱 (love)" may be disturbed from 0.2 to 0.9, and the dependence degree or attention degree of "篮 (basket)" on "球 (ball)" may be disturbed from 0.8 to 0.5, so that an ML model may output a predicted character according to the modified attention weight.

In a possible implementation of the embodiment of the present disclosure, an attention weight output by an attention layer is in matrix form, and the matrix corresponding to the attention weight has a plurality of dimensions of weight components, and a random number may be generated within a preset range, which is denoted as a first random number in the present disclosure. For example, within a range of (−1, 1), a first random number is randomly generated, which is configured to replace one or more dimensions of weight components in the matrix, so as to achieve disturbance on an attention weight predicted by the attention layer.

In another possible implementation of the embodiment of the present disclosure, an attention weight output by an attention layer is in matrix form, and the matrix corresponding to the attention weight has a plurality of dimensions of weight components, and a first random number may be generated, which is denoted as a second random number in the present disclosure, which is configured to update one or more dimensions of weight components in the matrix.

For example, a second random number may be subtracted from one or more dimensions of weight components in the matrix, and/or, and a second random number may be added to one or more dimensions of weight components in the matrix, to obtain an updated attention weight.

The weight component may be configured to represent an attention degree or a dependence degree of the corresponding input character on other characters. The higher attention degree or dependence degree, the greater the value of the weight component, and on the contrary, the lower the attention degree or dependence degree is, the smaller the value of the weight component is.

In an example, the number of weight components that need to be disturbed in the matrix may be preset, which is denoted as a first number in the present disclosure, for example, the first number may be one or more, which is not limited here. After a first number is determined, the weight component of a first number dimension may be randomly selected for disturbance from the matrix corresponding to the attention weight. Of course, all dimensions of weight components may be disturbed, for example, all elements in the matrix may be added by a random number to achieve disturbance on the attention weight, which is not limited here.

In another example, the dimension corresponding to the weight component that needs to be disturbed in the matrix may be preset, so that the corresponding dimension of weight component in the matrix may be disturbed according to the specified dimension. Of course, all dimensions of weight components may be disturbed, for example, all elements in the matrix may be added by a random number to achieve disturbance on the attention weight, which is not limited here.

Thus, the attention weight captured by the attention layer may be disturbed in various ways, to improve the applicability of the method.

At block 205, the ML model is trained according to a difference between the predicted character and a labeled character in the training sample.

In the embodiment of the present disclosure, the labeled character in the training sample may be each character in the standard translation text corresponding to the input information labeled on a training sample. For example, the training sample may be generated based on the bilingual sentences which are translated in two languages, and input information may be one sentence in the bilingual sentences, the labeled characters may be characters in the other sentence which are labeled in the training sample.

It should be understood that, the predicted character is each character predicted by the ML model, and the labeled character is each character in the standard translation text corresponding to the input information. When the difference between the predicted character and the labeled character is minimum, the prediction precision of the ML model is higher, performance is better, and the accuracy of the translation result is higher. Therefore, in the present disclosure, the ML model may be trained according to the difference between the predicted character and the labeled character in the training sample. For example, when the difference between the predicted character and the labeled character in the training sample is large, parameters of an ML model may be adjusted so as to minimize the difference between the predicted character and the labeled character.

According to the method for adversarial training of an ML model in the embodiment of the present disclosure, features of a plurality of input characters in the input information are extracted; the features of the plurality of input characters are inputted into the ML model, to capture an attention weight on an input character of the plurality of input characters by an attention layer of the ML model; the attention weight captured by the attention layer is disturbed, so that the ML model outputs a predicted character according to the attention weight disturbed; and the ML model is trained according to a difference between the predicted character and a labeled character in the training sample. Thus, in the process of training an ML model, an attention weight output by an attention layer is disturbed to interfere with training of an ML model, thereby achieving adversarial training of a model and enhance generalization and robustness of a model.

In the embodiment of the present disclosure, a deep learning (DL) method or an ML method in the AI field may be adopted to train the ML model, in which, AI is a subject that learns simulating certain thinking processes and intelligent behaviors (such as learning, reasoning, thinking, planning, etc.) of human beings by a computer, which covers hardware-level technologies and software-level technologies. AI hardware technologies generally include technologies such as sensors, dedicated AI chips, cloud computing, distributed storage, big data processing, etc.; AI software technologies mainly include computer vision technology, speech recognition technology, natural language processing (NLP) technology and machine learning (ML)/deep learning (DL), big data processing technology, knowledge graph (KG) technology, etc.

In a possible implementation of the embodiment of the present disclosure, features of at least one input character in a plurality of input characters may be disturbed. For example, the value of at least one dimension in the features of at least one input character may be replaced, for example, by other values, or, a preset number or a random number may be used to update the value of at least one dimension in the features of at least one input character, for example, the value of at least one dimension in the features of at least one input character may be added to a preset number or a random number to obtain updated features. Thus, disturbance may be performed on the features of the input characters to interfere with training of an ML model, further to achieve adversarial training of a model and further enhance generalization and robustness of a model.

It should be noted that, the execution time on feature disturbance in the present disclosure is not limited. For example, after features of a plurality of input characters are extracted, that is, after the above block 202, disturbance may be performed on the features of at least one input character in a plurality of input characters, or when the attention weight captured by the attention layer is disturbed, disturbance may be performed on the features of at least one input character in a plurality of input characters.

For example, when the language of the input characters is Chinese, the feature of each input character is a character vector, and the value of at least one dimension in the character vector may be replaced, and when the language of the input characters is English, the feature of each input character is a word vector, and the value of at least one dimension in the word vector may be updated, for example, a random number is added to at least one dimension of value.

In a possible implementation of the embodiment of the present disclosure, the ML model may be a model constructed based on Transformer, and a model may include a plurality of attention layers, and the attention weight output by the target attention layer may be disturbed on the target attention layer of a plurality of attention layers of the model. The above process is described in detail below in combination with the second embodiment. FIG. 3 is a flowchart illustrating a method for adversarial training of a Machine Learning (ML) model provided in a second embodiment of the present disclosure.

As illustrated in FIG. 3, the method for adversarial training of an ML model may include the following blocks:

At block 301, input information in a training sample is obtained.

At block 302, features of a plurality of input characters in the input information are extracted.

At block 303, the features of the plurality of input characters are inputted into the ML model, to capture an attention weight on an input character of the plurality of input characters by an attention layer of the ML mode.

In the embodiment of the present disclosure, ML model includes a plurality of attention layers. For example, an ML model takes Base Transformer as the basic structure, which may include 12 layers, the number of attention layers is 12. Each attention layer in the ML model may be configured to capture and obtain the corresponding attention weight on a plurality of input characters.

For example, an attention layer may be a Self-Attention layer or a Multi-Head Attention layer, an attention layer may perform specific computation processing on each input character and other characters in the input information, to obtain a numeric value, which may be a weight component corresponding to the input character, that is, the attention layer may compute features of the input character and other characters, to determine a weight component of the attention degree of the input character on the adjacent input characters.

The execution process of blocks 301 to 303 may refer to the execution process of blocks 201 to 203 in the above embodiments, which will not be repeated here.

At block 304, at least one target attention layer is randomly selected from the plurality of attention layers.

In the embodiment of the present disclosure, the number of target attention layers may be preset, which is denoted as a second number in the present disclosure, for example, the second number may be one or more, which is not limited here. After the second number of the target attention layers selected is determined, a second number of target attention layers may be randomly selected from a plurality of attention layers.

At block 305, the attention weight output by the target attention layer is disturbed, so that the ML model outputs a predicted character according to the attention weight disturbed.

In the embodiment of the present disclosure, after the target attention layers are selected, the attention weight output by the target attention layer may be disturbed.

In a possible implementation of the embodiment of the present disclosure, an attention weight output by an attention layer is in matrix form, and the matrix corresponding to the attention weight has multiple dimensions of weight components, and a random number may be generated within a preset range, which is denoted as a first random number in the present disclosure. For example, within a range of $(-1, 1)$, a first random number is randomly generated, which is configured to replace one or more dimensions of weight components in the matrix, so as to achieve disturbance on an attention weight output by the target attention layer.

In another possible implementation of the embodiment of the present disclosure, the attention weight output by a target attention layer is in a matrix form, and the matrix corresponding to the attention weight has multiple dimensions of weight components, and a random number may be generated, which is denoted as a second random number in the present disclosure, and configured to update one or more dimensions of weight components in the matrix corresponding to the attention weight output by the target attention layer. For example, a second random number may be subtracted from one or more dimensions of weight components in the matrix corresponding to the attention weight output by the target attention layer, and/or, and a second random number may be added to one or more dimensions of weight components in the matrix corresponding to the attention weight output by the target attention layer, to obtain an updated attention weight.

Thus, the attention weight output by the target attention layer may be disturbed in various ways, to improve the applicability of the method.

At block 306, the ML model is trained according to a difference between the predicted character and a labeled character in the training sample.

The execution process of block 306 may refer to the execution process of block 205 in the above embodiments, which will not be repeated here.

As an example, FIG. 4 is a schematic diagram illustrating a structure of a Machine Learning (ML) model in the embodiment of the present disclosure. Matmul refers to matrix multiplication, SoftMax represents an activation function, Mask represents a mask codes, and three inputs of a Self-Attention layer are $Q \in R^{n \times d_k}$, $K \in R^{m \times d_k}$, $V \in R^{m \times d_v}$. An attention layer may output to obtain an attention weight of the attention degree of each character on other characters, and an attention weight may be disturbed after SoftMax.

In the method for adversarial training of a Machine Learning (ML) model in the embodiment of the present disclosure, at least one target attention layer is randomly selected from a plurality of attention layers, so that the ML model outputs predicted characters according to the attention weight after disturbance. Thus, in the process of training an ML model, an attention weight output by a target attention layer may be disturbed to interfere with training of an ML model, further to achieve adversarial training of model and enhance generalization and robustness of a model.

In a possible implementation of the embodiment of the present disclosure, the above ML model may be a model constructed based on Transformer, for example, the method for adversarial training in the embodiment of the present disclosure may be applied to a pretraining stage and a fine tuning stage of a pretraining language model based on Transformer. The attention weight output on the attention layer may be disturbed in a pretraining stage and a fine tuning stage, to enhance generalization and robustness of a model.

The method for adversarial training in the embodiment of the present disclosure may further introduce a strategy of an adversarial sample from the perspective of Self-Attention based on ALUM. For example, in a Transformer architecture, an ML model may consist of a plurality of layers of Multi-Head Attention+Feed Forward modules, and the Feed Forward module is configured to integrate and filter information obtained by a Multi-Head Attention module. Multi-Head Attention, as a core strategy of Transformer, may utilize Self-Attention to capture a dependence relationship or an attention degree between token and token, to generate an attention weight configured to represent the dependence relationship or the attention degree of each token on other tokens, and the Attention Weights generated are numeric value representation of the dependence relationship or the attention degree. Therefore, direct disturbance on an attention weight may fundamentally interfere with training of the model, so as to achieve adversarial training of the model.

For example, when the language of the input information is Chinese, disturbance may be added on the attention weight configured to represent the dependence degree or the attention degree between characters produced on a Multi-Head Attention layer, for example, one random number is added to at least one dimension of weight component of the attention weight. For example, assume that the input information is " 我爱打篮球 (I love to play basketball.)", 0.7 is added to the dependence relationship or the attention degree (0.2) between "爱 (I)" and "篮 (basket)" (that is, 0.9), −0.3 is added to the dependence relationship or the attention degree (0.8) between "篮 (basket)" and "球 (ball)" (that is, 0.5), so as to interfere with the training of a model and further achieve adversarial training.

In the pretraining stage, in the process of predicting each round of characters by a model, disturbance may be added from one randomly selected from an embedding space and an attention weight space, that is, feature disturbance and attention weight disturbance are performed on the features of the input characters. Assume that the model takes 12 layers of Base Transformers, the number of attention layers is 12, and feature disturbance and attention weight disturbance on an embedding space and an attention weight space is 13 in total, in the process of training a training sample by a model, at least one may be selected from 13 disturbances randomly to add disturbance.

In the fine tuning stage, the way of adding disturbance may be consistent with that in the pretraining stage.

Therefore, based on the way of disturbance on attention weight, adversarial training may be performed on a model so that the model fully takes the advantage of Self-Attention in Transformer.

Corresponding to the method for adversarial training of an ML model provided in the embodiments of FIG. 2 to FIG. 3, an apparatus for adversarial training of an ML model may be further provided. Since the apparatus for adversarial training of an ML model provided in the embodiment of the present disclosure corresponds to the method for adversarial training of an ML model provided in the embodiments of FIG. 2 to FIG. 3, the execution way of the method for adversarial training of an ML model provided may be applied to an apparatus for adversarial training of an ML model provided in the embodiment of the present disclosure, which is not described here.

Figure 5:
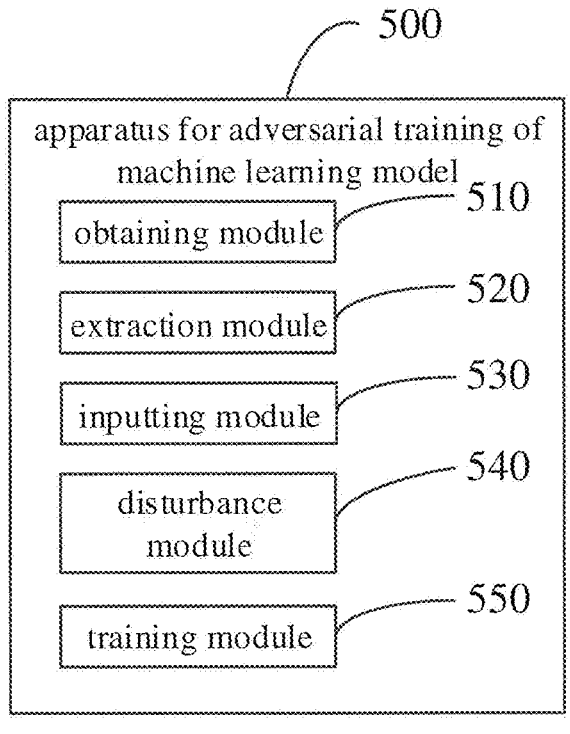
FIG. 5 is a schematic diagram illustrating a structure of an apparatus for adversarial training of a Machine Learning (ML) model provided in a third embodiment of the present disclosure.

FIG. 5 is a schematic diagram illustrating a structure of an apparatus for adversarial training of a Machine Learning (ML) model provided in a third embodiment of the present disclosure.

As illustrated in FIG. 5, the apparatus 500 for adversarial training of the ML model includes an obtaining module 510, an extraction module 520, an inputting module 530, a disturbance module 540 and a training module 550.

The obtaining module 510 is configured to obtain input information in a training sample.

The extraction module 520 is configured to extract features of a plurality of input characters in the input information.

The inputting module 530 is configured to input the features of the plurality of input characters to the ML model, to capture an attention weight on an input character of the plurality of input characters by an attention layer of the ML model.

The disturbance model 540 is configured to disturb the attention weight captured by the attention layer, so that the ML model outputs a predicted character according to the attention weight disturbed.

The training model 550 is configured to train the ML model according to a difference between the predicted character and a labeled character in the training sample.

In a possible implementation of the embodiment of the present disclosure, an attention weight is in a matrix form, and the disturbance module 540 is configured to generate a first random number within a preset range, and replace one or more dimensions of weight components in the matrix by the first random number.

In a possible implementation of the embodiment of the present disclosure, an attention weight is in a matrix form, and the disturbance module 540 is specifically configured to generate a second random number, and update one or more dimensions of weight components in the matrix by the second random number.

In a possible implementation of the embodiment of the present disclosure, the disturbance module 540 is further configured to disturb features of at least one input character in the plurality of input characters.

In a possible implementation of the embodiment of the present disclosure, the ML model may include a plurality of attention layers, in which, the disturbance module 530 is configured to randomly select at least one target attention layer from the plurality of attention layers; disturb the attention weight output by the target attention layer.

In a possible implementation of the embodiment of the present disclosure, the attention weight is configured to represent an attention degree of the input character on other characters in the plurality of input characters.

According to the apparatus for adversarial training of an ML model in the embodiment of the present disclosure, features of a plurality of input characters in the input information are extracted; the features of they plurality of input characters are inputted into the ML model, to capture an attention weight on an input character of the plurality of input characters by an attention layer of the ML model; the attention weight captured by the attention layer is disturbed, so that the ML model outputs a predicted character according to the attention weight disturbed; and the ML model is trained according to a difference between the predicted character and a labeled character in the training sample. Thus, in the process of training an ML model, an attention weight output by an attention layer is disturbed to interfere with training of an ML model, further to achieve adversarial training of a model and enhance generalization and robustness of a model.

According to embodiments of the present disclosure, an electronic device and a readable storage medium are further provided in the embodiment.

Figure 6:
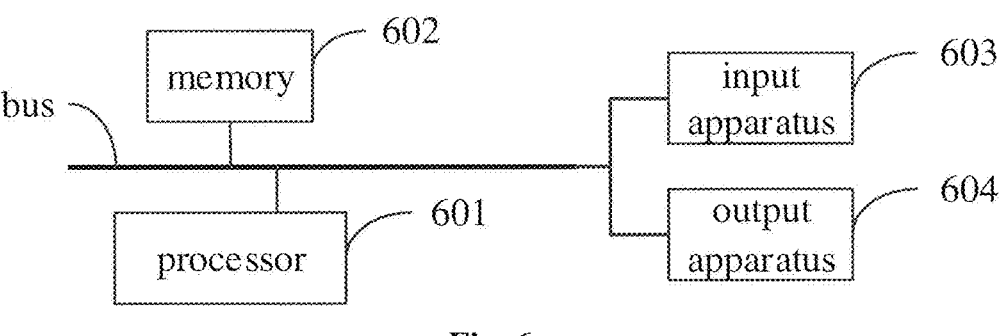
FIG. 6 is a block diagram illustrating an electronic device according to the method for adversarial training of a Machine Learning (ML) model provided in the embodiment of the present disclosure.

FIG. 6 is a block diagram illustrating an electronic device in the method for adversarial training of a Machine Learning (ML) model provided in the embodiment of the present disclosure. An electronic device is intended to represent various types of digital computers, such as laptop computers, desktop computers, workstations, personal digital assistants, servers, blade servers, mainframe computers, and other suitable computers. An electronic device may also represent various types of mobile apparatuses, such as personal digital assistants, cellular phones, smart phones, wearable devices, and other similar computing devices. The components shown herein, their connections and relations, and their functions are merely examples, and are not intended to limit the implementation of the disclosure described and/or required herein.

As shown in FIG. 6, the electronic device includes: one or more processors 601, a memory 602, and an interface configured to connect various components, including a high-speed interface and a low-speed interface. The various components are connected to each other with different buses, and may be installed on a public main board or installed in other ways as needed. The processor may process instructions executed in the electronic device, including instructions stored in or on the memory to display graphical information of the GUI on an external input/output device (such as a display device coupled to an interface). In other implementations, multiple processors and/or multiple buses may be configured with multiple memories if necessary. Similarly, the processor may connect multiple electronic devices, and each device provides a part of necessary operations (for example, as a server array, a group of blade servers, or a multi-processor system). FIG. 6 takes one processor 601 as an example.

A memory 602 is a non-transitory computer-readable storage medium provided in the present disclosure. The memory stores instructions executable by the at least one processor, so that the at least one processor executes a method for adversarial training of an ML model as described in the present disclosure. The non-transitory computer-readable storage medium of the present disclosure stores computer instructions, in which the computer instructions are configured so that a method for adversarial training of an ML model provided in the present disclosure.

As a non-transitory computer-readable storage medium, the memory 602 may be configured to store non-transitory software programs, non-transitory computer-executable programs, and modules, such as program instructions/modules corresponding to a method for adversarial training of an ML model in the embodiment of the present disclosure (for example, an obtaining module 510, an extraction module 520, an inputting module 530, a disturbance module 540 and a training module 550 as illustrated in FIG. 5). The processor 601 executes various functional applications and data processing of the server by running a non-transitory software program, an instruction, and a module stored in the memory 602, that is, a method for adversarial training of an ML model in the above method embodiment is implemented.

The memory 602 may include a program storage area and a data storage area; the program storage area may store operation systems and application programs required by at least one function; the data storage area may store data created based on the use of an electronic device according to the method for adversarial training of an ML model, etc. In addition, the memory 602 may include a high-speed random access memory, and may also include a non-transitory memory, such as at least one magnetic disk storage device, a flash memory device, or other non-transitory solid-state storage devices. In some embodiments, the memory 602 optionally includes a memory set remotely relative to the processor 601 that may be connected to an electronic device via a network. The example of the above networks includes but not limited to an Internet, an enterprise intranet, a local area network, a mobile communication network and their combination.

An electronic device may further include an input apparatus 603 and an output apparatus 604. The processor 601, the memory 602, the input apparatus 603, and the output apparatus 604 may be connected through a bus or in other ways. FIG. 6 takes connection through a bus as an example.

The input apparatus 603 may receive input digital or character information, and generate key signal input related to user setting and function control of an electronic device, such as a touch screen, a keypad, a mouse, a track pad, a touch pad, an indicating rod one or more mouse buttons, a trackball, a joystick and other input apparatuses. The output apparatus 604 may include a display device, an auxiliary lighting apparatus (for example, a LED) and a tactile feedback apparatus (for example, a vibration motor), etc. The display device may include but not limited to a liquid crystal display (LCD), a light emitting diode (LED) display and a plasma display. In some implementations, a display device may be a touch screen.

Various implementation modes of the systems and technologies described herein may be implemented in a digital electronic circuit system, an integrated circuit system, a dedicated ASIC (application specific integrated circuit), a computer hardware, a firmware, a software, and/or combinations thereof. The various implementation modes may include: being implemented in one or more computer programs, and the one or more computer programs may be executed and/or interpreted on a programmable system including at least one programmable processor, and the programmable processor may be a dedicated or a general-purpose programmable processor that may receive data and instructions from a storage system, at least one input apparatus, and at least one output apparatus, and transmit the data and instructions to the storage system, the at least one input apparatus, and the at least one output apparatus.

The computer programs (also called as programs, software, software applications, or codes) include machine instructions of a programmable processor, and may be implemented with high-level procedure and/or object-oriented programming languages, and/or assembly/machine languages. As used herein, the terms "a machine-readable medium" and "a computer-readable medium" refer to any computer program product, device, and/or apparatus configured to provide machine instructions and/or data for a programmable processor (for example, a magnetic disk, an optical disk, a memory, a programmable logic device (PLD)), including a machine-readable medium that receive machine instructions as machine-readable signals. The term "a machine-readable signal" refers to any signal configured to provide machine instructions and/or data for a programmable processor.

In order to provide interaction with the user, the systems and technologies described here may be implemented on a computer, and the computer has: a display apparatus for displaying information to the user (for example, a CRT (cathode ray tube) or a LCD (liquid crystal display) monitor); and a keyboard and a pointing apparatus (for example, a mouse or a trackball) through which the user may provide input to the computer. Other types of apparatuses may further be configured to provide interaction with the user; for example, the feedback provided to the user may be any form of sensory feedback (for example, visual feedback, auditory feedback, or tactile feedback); and input from the user may be received in any form (including an acoustic input, a voice input, or a tactile input).

The systems and technologies described herein may be implemented in a computing system including back-end components (for example, as a data server), or a computing system including middleware components (for example, an application server), or a computing system including front-end components (for example, a user computer with a graphical user interface or a web browser through which the user may interact with the implementation mode of the system and technology described herein), or a computing system including any combination of such back-end components, middleware components or front-end components. The system components may be connected to each other through any form or medium of digital data communication (for example, a communication network). Examples of communication networks include: a local area network (LAN), a wide area network (WAN), a blockchain network, and an internet.

The computer system may include a client and a server. The client and server are generally far away from each other and generally interact with each other through a communication network. The relation between the client and the server is generated by computer programs that run on the corresponding computer and have a client-server relationship with each other. A server may be a cloud server, also known as a cloud computing server or a cloud host, is a host product in a cloud computing service system, to solve the shortcomings of large management difficulty and weak business expansibility existed in the traditional physical host and Virtual Private Server (VPS) service. A server further may be a server with a distributed system, or a server in combination with a blockchain.

According to the embodiment of the present disclosure, a computer program product is provided, and the instructions in the computer program are configured to execute the method for adversarial training of an ML model described in the above claims when executed by a processor.

According to the technical scheme of the embodiment of the present disclosure, features of a plurality of input characters in the input information of a training sample are extracted to obtain features of a plurality of input characters; features of a plurality of input characters are input to an ML model to capture an attention weight on a plurality of input characters by an attention layer of an ML model; the attention weight captured by the attention layer is disturbed, so that the ML model outputs predicted characters according to the attention weight after disturbance; an ML model is trained according to the difference between the predicted characters and the labeled characters in the training sample. Thus, in the process of training an ML model, an attention weight output by an attention layer is disturbed to interfere, with training of an ML model, further to achieve adversarial training of a model and enhance generalization and robustness of a model.

it should be understood that, various forms of procedures shown above may be configured to reorder, add or delete blocks. For example, blocks described in the present disclosure may be executed in parallel, sequentially, or a different order, as long as the desired result of the technical solution disclosed in the present disclosure may be achieved, which will not be limited herein.

The above specific implementations do not constitute a limitation on the protection scope of the present disclosure. Those skilled in the art should understand that various modifications, combinations, sub-combinations and substitutions may be made according to design requirements and other factors. Any modification, equivalent replacement, improvement, etc., made within the spirit and principle of embodiments of the present disclosure shall be included within the protection scope of embodiments of the present disclosure.

What is claimed is:

1. A method for adversarial training of a machine learning (ML) model, comprising:

obtaining input information in a training sample;

extracting features of a plurality of input characters in the input information;

inputting the features of the plurality of input characters to the ML model, to capture an attention weight on an input character of the plurality of input characters by an attention layer of the ML model;

disturbing the attention weight captured by the attention layer, so that the ML model outputs a predicted character according to the attention weight disturbed; and training the ML model according to a difference between the predicted character and a labeled character in the training sample;

further comprising:

disturbing features of at least one input character in the plurality of input characters to add noise to the plurality of characteristics;

translating text information in a first language into text information in a second language based on a trained ML model, wherein the first language is different from the second language.

2. The method of claim 1, wherein the attention weight is represented in a matrix, and disturbing the attention weight captured by the attention layer comprises:

generating a first random number within a preset range, and replacing one or more dimensions of weight components in the matrix by the first random number.

3. The method of claim 1, wherein the attention weight is represented in a matrix, and disturbing the attention weight captured by the attention layer comprises:

generating a second random number, and updating one or more dimensions of weight components in the matrix by the second random number.

4. The method of claim 1, wherein the ML model comprises a plurality of attention layers, and disturbing the attention weight captured by the attention layer comprises:

randomly selecting at least one target attention layer from the plurality of attention layers;

disturbing the attention weight output by the target attention layer.

5. The method of claim 1, wherein, the attention weight is configured to represent an attention degree of the input character on other characters in the plurality of input characters.

6. An apparatus for adversarial training of a machine learning (ML) model, comprising:

one or more processors;

a memory storing instructions executable by the one or more processors;

wherein the one or more processors are configured to:

obtain input information in a training sample;

extract features of a plurality of input characters in the input information;

input the features of the plurality of input characters to the ML model, to capture an attention weight on an input character of the plurality of input characters by an attention layer of the ML model;

disturb the attention weight captured by the attention layer, so that the ML model outputs a predicted character according to the attention weight disturbed;

train the ML model according to a difference between the predicted character and a labeled character in the training sample;

wherein the one or more processors are further configured to:

disturb features of at least one input character in the plurality of input characters to add noise to the plurality of input characteristics;

translate text information in a first language into text information in a second language based on a trained ML model, wherein the first language is different from the second language.

7. The apparatus of claim 6, wherein the attention weight is represented in a matrix, and the one or more processors are configured to:

generate a first random number within a preset range, and replace one or more dimensions of weight components in the matrix by the first random number.

8. The apparatus of claim 6, wherein the attention weight is represented in a matrix, and the one or more processors are configured to:

generate a second random number, and update one or more dimensions of weight components in the matrix by the second random number.

9. The apparatus of claim 6, wherein the ML model comprises a plurality of attention layers, and the one or more processors are configured to:

randomly select at least one target attention layer from the plurality of attention layers;

disturb an attention weight output by the target attention layer.

10. The apparatus of claim 9, wherein, the attention weight is configured to represent an attention degree of the input character on other characters in the plurality of input characters.

11. A non-transitory computer-readable storage medium storing computer instructions, wherein when the computer instructions are executed by a computer, the computer is caused to execute a method for adversarial training of a machine learning (ML) model, and the method comprises:

obtaining input information in a training sample;

extracting features of a plurality of input characters in the input information;

inputting the features of the plurality of input characters to the ML model, to capture an attention weight on an input character of the plurality of input characters by an attention layer of the ML model;

disturbing the attention weight captured by the attention layer, so that the ML model outputs a predicted character according to the attention weight disturbed; and training the ML model according to a difference between the predicted character and a labeled character in the training sample;

the method further comprising:

disturbing features of at least one input character in the plurality of input characters to add noise to the plurality of characteristics;

translating text information in a first language into text information in a second language based on a trained ML model, wherein the first language is different from the second language.

12. The non-transitory computer-readable storage medium of claim 11, wherein the attention weight is represented in a matrix, and disturbing the attention weight captured by the attention layer comprises:

generating a first random number within a preset range, and replacing one or more dimensions of weight components in the matrix by the first random number.

13. The non-transitory computer-readable storage medium of claim 11, wherein the attention weight is represented in a matrix, and disturbing the attention weight captured by the attention layer comprises:

generating a second random number, and updating one or more dimensions of weight components in the matrix by the second random number.

14. The non-transitory computer-readable storage medium of claim 11, wherein the ML model comprises a plurality of attention layers, and disturbing the attention weight captured by the attention layer comprises:

randomly selecting at least one target attention layer from the plurality of attention layers;

disturbing the attention weight output by the target attention layer.

15. The non-transitory computer-readable storage medium of claim 11, wherein, the attention weight is configured to represent an attention degree of the input character on other characters in the plurality of input characters.

* * * * *